(12) United States Patent
Jones et al.

(10) Patent No.: US 11,048,853 B2
(45) Date of Patent: Jun. 29, 2021

(54) SYSTEM AND METHOD FOR RESOURCE PRESENTATION

(71) Applicant: ServiceNow, Inc., Santa Clara, CA (US)

(72) Inventors: Jerry Jones, La Mesa, CA (US); William Lisac, San Diego, CA (US); Guerric Sloan, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 298 days.

(21) Appl. No.: 15/339,163

(22) Filed: Oct. 31, 2016

(65) Prior Publication Data

US 2018/0124214 A1    May 3, 2018

(51) Int. Cl.
*G06F 17/00*     (2019.01)
*G06F 3/00*      (2006.01)
*G06F 40/106*    (2020.01)
*H04L 29/06*     (2006.01)
*H04L 29/08*     (2006.01)
*G06F 3/0481*    (2013.01)
*G06F 40/14*     (2020.01)

(52) U.S. Cl.
CPC .......... *G06F 40/106* (2020.01); *G06F 3/0481* (2013.01); *G06F 40/14* (2020.01); *H04L 67/02* (2013.01); *H04L 67/42* (2013.01)

(58) Field of Classification Search
CPC ...... G06F 3/0484; G06F 3/017; G06F 40/106; G06F 40/14; G06F 21/128; H04L 67/42
USPC ......................................... 715/744, 200, 234
See application file for complete search history.

(56) References Cited

U.S. PATENT DOCUMENTS

| | | | |
|---|---|---|---|
| 6,212,535 B1 * | 4/2001 | Weikart | G06Q 10/107 709/206 |
| 6,609,122 B1 | 8/2003 | Ensor | |
| 6,678,887 B1 | 1/2004 | Hallman | |
| 7,020,706 B2 | 3/2006 | Cates | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |

(Continued)

OTHER PUBLICATIONS

Tina Siber, Facebook Productivity Tips, Published Nov. 14, 2014, makeuseof.com, pp. 1-15 (pdf).*

(Continued)

*Primary Examiner* — Manglesh M Patel
(74) *Attorney, Agent, or Firm* — Fletcher Yoder PC (57) ABSTRACT

Systems, methods, and computer readable medium are provided for presenting requested resources on a mobile device. A method of this disclosure may include transmitting a uniform resource locator (URL) associated with a requested resource and receiving a response to the transmission of the URL, wherein the response comprises data usable by the mobile device to identify a resource type indicative of the requested resource. Based on the identified resource type, the requested resource can be presented using a user interface component or a web browser component depending on whether the identified resource type is capable of being presented by the user interface component without reliance on web browser functionality provided on the mobile device.

29 Claims, 4 Drawing Sheets

(56) References Cited

U.S. PATENT DOCUMENTS

| | | | |
|---|---|---|---|
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,402,127 B2 | 3/2013 | Solin | |
| 8,457,928 B2 | 6/2013 | Dang | |
| 8,478,569 B2 | 7/2013 | Scarpelli | |
| 8,489,702 B2 * | 7/2013 | Batson | H04L 65/60 709/217 |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,832,652 B2 | 9/2014 | Mueller | |
| 8,887,133 B2 | 11/2014 | Behnia | |
| 8,983,982 B2 | 3/2015 | Rangarajan | |
| 9,092,543 B2 * | 7/2015 | Sylthe | G06F 16/9577 |
| 9,098,322 B2 | 8/2015 | Apte | |
| 9,239,857 B2 | 1/2016 | Trinon | |
| 9,317,327 B2 | 4/2016 | Apte | |
| 9,363,252 B2 | 6/2016 | Mueller | |
| 9,508,051 B2 | 11/2016 | Falk | |
| 9,524,089 B1 * | 12/2016 | Ghosh | G06F 16/958 |
| 9,535,674 B2 | 1/2017 | Cooper | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,792,387 B2 | 10/2017 | George | |
| 9,805,322 B2 | 10/2017 | Kelkar | |
| 2007/0174490 A1 * | 7/2007 | Choi | G06F 8/70 709/246 |
| 2009/0282423 A1 * | 11/2009 | Smith | G06F 17/30893 719/328 |
| 2009/0288098 A1 * | 11/2009 | Abd-El-Malek | G06F 9/545 719/312 |
| 2011/0119585 A1 * | 5/2011 | Kim | G06F 17/30905 715/719 |
| 2011/0119601 A1 | 5/2011 | Knothe et al. | |
| 2011/0208801 A1 * | 8/2011 | Thorkelsson | H04L 67/2814 709/203 |
| 2013/0104114 A1 * | 4/2013 | Reiss | G06F 8/65 717/170 |
| 2014/0136945 A1 | 5/2014 | Ligman et al. | |
| 2015/0120470 A1 * | 4/2015 | Roever | G06Q 30/0267 705/14.73 |

OTHER PUBLICATIONS

Dallas Thomas, Redirect Links on Android to Open in the App you Really Wanted, Published Sep. 23, 2016, Gadget Hacks, pp. 1-6 (pdf).*

Tobias Beuscher, Death to In-App Browsers!, Published Sep. 13, 2015, medium.com, pp. 1-6 (pdf).*

Suterwala Abbas, Understanding Android WebViews, published May 13, 2015, sitepoint.com, pp. 1-28 (pdf).*

Traeg, Peter, "Best of Both Worlds: Mixing HTML5 and Native Code", Smashing Magazine, Apps, HTML5, Opinion Column, Oct. 17, 2013, https://www.smashingmagazine.com/2013/10/best-of-both-worlds-mixing-html5-native-code/, 32 pp.

Timme, Falko; "Apache2: How to Redirect Users to Mobile or Normal Web Site Based on Device Using mod-rewrite", HowtoForge, Linux Tutorials, Date Unknown, https://www.howtoforge.com/apache2-how-to-redirect-users-to-mobile-or-normal-web-site-based-on-device-using-mod_rewrite, downloaded Oct. 17, 2016, 10 pp.

Mobiledeeplinking, "Introduction", Deeplinking is a methodology for launching a native mobile application via a link, Date Unknown, downloaded Oct. 28, 2016, http://mobiledeeplinking.org/, 13 pp.

Mobile First Foundation, "Integrating Server-Generated Pages in Hybrid Applications", IBM MobileFirst Foundation Developer Center, Date Unknown, downloaded Oct. 28, 2016, https://mobilefirstplatform.ibmcloud.com/tutorials/en/foundation/7.1/advanced-topics/integrating-server-generated-pages-hybrid-applications/, 10 pp.

IBM Worklight Foundation, "Integrating Server-Generated Pages in Hybrid Applications", V6.2.0, Getting Started, IBM Corporation Dated Jun. 20, 2014, ftp://public.dhe.ibm.com/software/mobile-solutions/worklight/docs/v620/10_07_Integrating_server_generated_pages_in_Worklight_applications.pdf, 25 pp.

Devgirl's Weblog, "Mixing Cordova/Phonegap Components With Native IOS—Part 1", Web, Mobile Application Development, Jul. 22, 2014, http://devgirl.org/2014/07/22/mixing-cordova-phonegap-components-with-nativ/, 16 pp.

Github, "Director", Director/ReadMe.md at Master—FlatIron/Director, Jan. 6, 2015, https://github.com/flatiron/director/blob/master/README.md, 15 pp.

SEO Speed Mobile, "Mobile Redirect Issues", How to reduce mobile redirects, Mobile Redirect Problems and Solutions—Mobile Seo, Jan. 3, 2016, https://varvy.com/mobile/mobile-redirects.html, 25 pp.

* cited by examiner

SYSTEM AND METHOD FOR RESOURCE PRESENTATION

TECHNICAL FIELD

The present disclosure is generally related to information technology, including computer-implemented methods, systems, and apparatuses for resource presentation in an electronic computing and communication system.

BACKGROUND

An electronic computing and communication system may include one or more communicating and computing elements, which may, in the course of communicating and computing, receive and present resources at a client device. Presentation of such resources may present various challenges, including in instances where the client device is a mobile device.

SUMMARY

Disclosed herein are implementations of resource presentation in an electronic computing and communication system.

In an implementation, a method is provided that includes from a mobile device, transmitting a uniform resource locator (URL) associated with a requested resource, receiving a response to the transmission of the URL, wherein the response comprises data usable by the mobile device to identify a resource type indicative of the requested resource, based on the identified resource type, presenting the requested resource using a user interface component of an app running on the mobile device if the identified resource type is capable of being presented by the user interface component without reliance on web browser functionality provided on the mobile device or a web browser component used by the app running on the mobile device if the identified resource type is not capable of being presented using user interface components of the app.

In an implementation, a non-transitory computer-readable storage medium is provided that includes executable instructions that, when executed by a processor, facilitate performance of operations for resource presentation. The operations include, from a mobile device, transmitting a uniform resource locator (URL) associated with a requested resource, receiving a response to the transmission of the URL, wherein the response comprises data usable by the mobile device to identify a resource type indicative of the requested resource, based on the identified resource type, presenting the requested resource using a user interface component of an app running on the mobile device if the identified resource type is capable of being presented by the user interface component without reliance on web browser functionality provided on the mobile device or a web browser component used by the app running on the mobile device if the identified resource type is not capable of being presented using user interface components of the app.

In an implementation, a method is provided that includes from a mobile device, receiving a uniform resource locator (URL) associated with a requested resource, transmitting a response to the transmission of the URL, wherein the response comprises data usable by the mobile device to identify a resource type indicative of the requested resource for presenting the requested resource using a user interface component of an app running on the mobile device if the identified resource type is capable of being presented by the user interface component without reliance on web browser functionality provided on the mobile device or a web browser component used by the app running on the mobile device if the identified resource type is not capable of being presented using user interface components of the app.

In an implementation, a non-transitory computer-readable storage medium is provided that includes executable instructions that, when executed by a processor, facilitate performance of operations for resource presentation. The operations include, from a mobile device, receiving a uniform resource locator (URL) associated with a requested resource, transmitting a response to the transmission of the URL, wherein the response comprises data usable by the mobile device to identify a resource type indicative of the requested resource for presenting the requested resource using a user interface component of an app running on the mobile device if the identified resource type is capable of being presented by the user interface component without reliance on web browser functionality provided on the mobile device or a web browser component used by the app running on the mobile device if the identified resource type is not capable of being presented using user interface components of the app.

These and other aspects of the present disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Customers of a platform-as-a-service (PaaS) cloud computing provider can customize an instance of platform software to deliver application software based on their particular service and business management needs. For example, a customer can customize the platform software instance by adding or modifying scripts for executing routines related to services deliverable by the customer, but which are not originally provided by the platform software instance. For example, a platform software instance can be implemented using components such as described later with respect to FIG. 1 and/or FIG. 2.

Resources, such as web application pages, web service endpoints, script files, image files, and the like, provided by the platform software or customizations thereof may be accessible using Uniform Resource Locators (URLs), which may also be referred to as indicators herein. For example, a client, or other computing device, may request a resource from a server, or other data source, by sending a corresponding URL indicating the resource to the server, and the server, in response to receiving the requested URL, may identify or generate information based on the request URL, and may transmit the identified or generated information to the client. For example, web application pages, web service endpoints, script files, image files, video files, or other resources accessible using the platform software may be associated with individual URLs.

In some implementations, certain resources may have URLs constructed in a form that permits the determination of the type or class of the resource that the URL is associated with. For example, a URL including "$m.do/form/incident" may indicate that the resource type of the associated resource is a form. Resource types and classes can be used to categorize resources made available by the platform software based on, for example, how the resources are presented. For example, a form resource (which may include, for example, a set of tables having labels and data entry user interface elements for modifying a number of fields associated with a database record) may present differently than a chat resource (which may include, for example, a user interface element for displaying chat entries from various users, a listing of users in the chat, and a text box for adding a chat message). Resource types and classes may be hierarchical, such that a particular resource type or class may inherit aspects of an antecedent resource type or class.

A resource can be requested, for example, by a web browser on a client device that is a laptop device, desktop device, or the like. For example, such a client device can be implemented using components such as described later with respect to FIG. 2. In such a case, the resource may be able to be presented by the web browser on a display attached to the laptop device or desktop device in the manner in which the resource was intended to be displayed (e.g., as a rendered web page on a screen having a larger size (e.g., 24 inches) and a higher resolution (e.g., 1920×1080 pixels). In such a case, there may be no need to change or alter how the resource is presented.

However, a resource could instead by requested, for example, by a mobile device having a smaller screen (e.g., 4 inches) and a lower resolution (e.g., 375×667 pixels). For example, a mobile device may be a smartphone, a tablet, or a virtual mobile device. For example, such a mobile device can be implemented using components such as described later with respect to FIG. 2. In such a case, it may be desirable to change or alter how the resource is presented. In some implementations, a resource can be made available by the platform software in multiple forms, including one web page format suitable for a desktop device, and another web page format suitable for a mobile device. For example, the platform software may be able to identify that a device is a mobile device based on information included in one or more communications transmitted from the mobile device to the platform software and may in response transmit the web page format suitable for the mobile device.

However, in such an implementation, the web page format for the mobile device may provide a suboptimal user experience because the web page user interface may not be optimized for the platform or computing environment used by the mobile device. A computing environment indicates a class or type of mobile device, such as based on the hardware configuration or version of the mobile device, an operating system, associated components, or versions thereof provided by the mobile device or operating system (e.g., iOS, UIKit, Android, or the like), or combinations thereof.

A mobile device computing environment may provide functionality to permit the installation of an application developed for that platform or computing environment (e.g., an "app"). The app may include functionality for presenting resources using a user interface component or a web browser component. A resource is presented using a user interface component when the resource is presented using user interface elements specific to the mobile device computing environment (e.g., using user interface elements including functionality other than rendering web-based formats). A resource is presented using a web browser component when the resource is presented in a web-based format. For example, the resource may be implemented as a web page using Hypertext Markup Language (HTML), Cascading Style Sheets (CSS), JavaScript, and the like and the web page can be rendered using a web browser or web browser component available on the mobile device. Such a resource can be designed such that it is presentable in a cross-platform manner (e.g., across multiple types of computing environments, platforms, and devices, such as mobile devices and laptop devices) and thus might not take advantage of components that optimize the user interface for the present platform or computing environment. A resource, such as a web page, can be presented using a web browser component, which can be configured to render the cross-platform content of the resource.

Thus, it can be advantageous to present resources using user interface elements provided by the platform or computing environment of the mobile device in such a way that they can utilize functionality specific to and provided by the platform or computing environment. This can be done using a user interface component, which can, for example, be implemented by an app installed on the mobile device. In some implementations, a user interface component can perform a computing environment-specific computing function based on the resource, such as by generating and presenting a computing environment-specific representation of the resource. In some implementations, a user interface component may be an application, or a module of an application, implemented on a mobile device to present a representation of information corresponding to a requested resource using a platform-specific technique, such as using a platform-specific application programming interface (API).

For example, a form for entering a number can be presented natively which can include rendering the form in a more visually appealing manner, with less delay, and using a user input of a keypad instead of a keyboard. This can be done, for example, by identifying the type of resource associated with a URL and, instead of presenting the web page provided by that URL, instead present native user interface elements in its place using a user interface component (but, for example, using data provided by the resource or associated with the resource).

In order to determine whether to present a resource using a user interface component or a web browser component, a determination is made as to whether there is a user interface component capable of presenting the resource. In the case where the resource is identified using a URL from which the class or type of resource can be determined, this determination can be made based on the URL and the available user interface components (e.g., to determine whether there is a user interface component capable of presenting a form type of resource).

However, the class or type of resource may not be identifiable based on the URL (e.g., the content of the indicator), such as in cases where a platform software instance has been customized or modified. For example, a user of the platform software instance may have modified the platform software instance such that a custom URL is used to identify a resource, or a custom URL is included within a resource for reference to another resource. For example, it may not be possible, feasible, or known how to tell from the URL whether it relates to a form, list, chat, or other type of resource that may be able to be presented using a user interface component.

In order to determine how to present the resource, the mobile device can send a request for or about the resource. The platform software can send a response to the mobile device including a different URL or other structured data from which the mobile device application can identify the type or class of the resource being requested. In response to this determination, the mobile device app can identify whether a user interface component is available for the identified type or class of resource. If a user interface component is available, the resource can be presented using that user interface component. If a user interface component is not available, the resource can be presented using a web browser component (e.g., a resource web page can be rendered for presentation on the mobile device).

The systems and methods of the present disclosure address problems particular to computer networks and the use or display of resources on client devices. These computing network-specific issues can be solved by implementations of the present disclosure. The implementations of the present disclosure thus introduce new and efficient improvements in the ways in which resources are requested and presented. For example, implementations of the present disclosure can solve the problem of determining a type of resource associated with a customized URL by sending a request to a server for structured data about the resource and then determining whether to present the resource using a user interface component or a web browser component in response to the structured data. The preceding overview is provided to enable a basic or general understanding of various aspects of the non-limiting embodiments that follow and the accompanying drawings. This overview is not intended as an exhaustive or complete description. Instead, the purpose of this overview is to introduce some concepts of this disclosure as a prelude to the following more detailed descriptions of the various embodiments.

Figure 1:
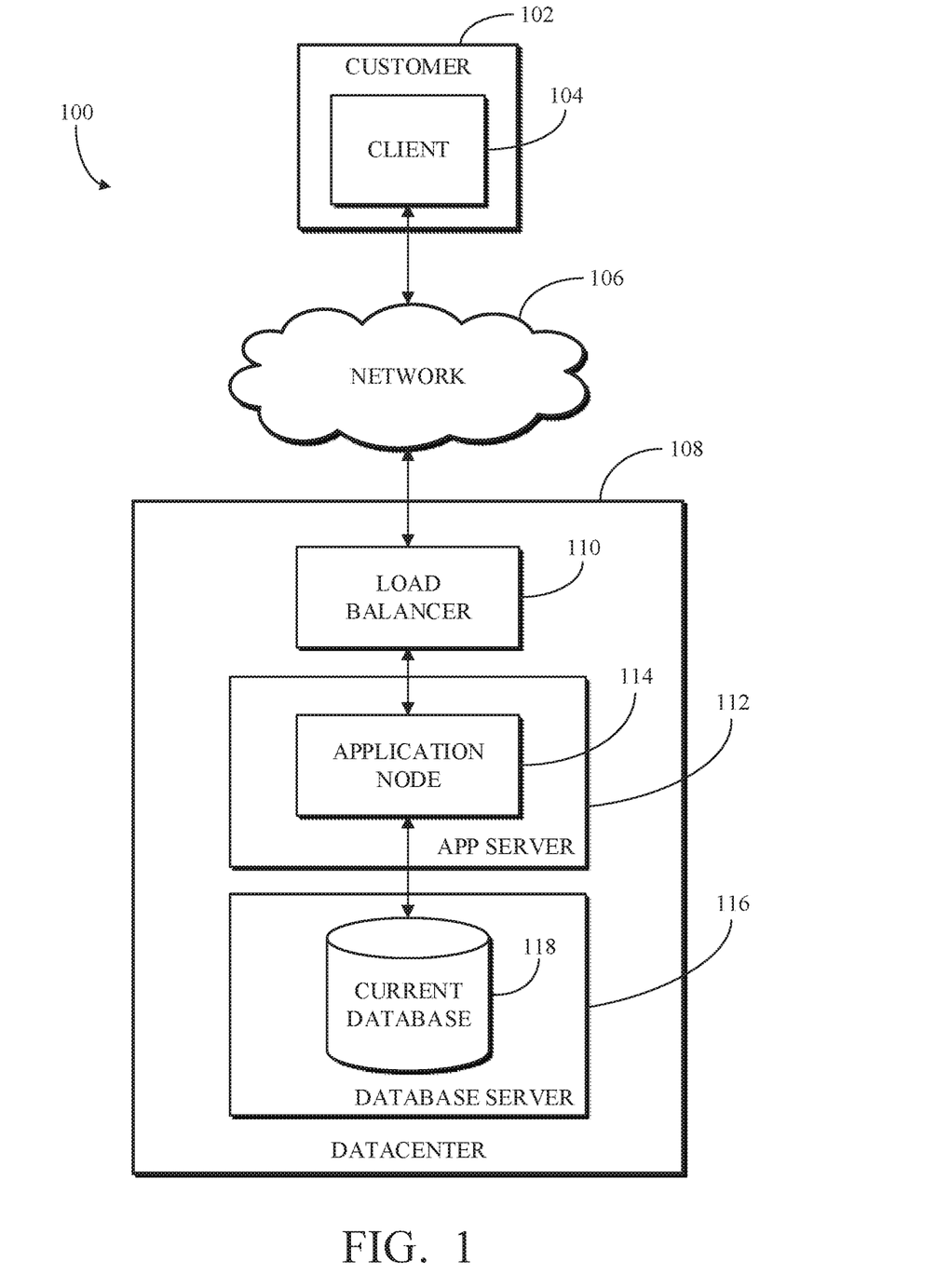
FIG. 1 is a diagram of an example of an electronic computing and communication system in accordance with this disclosure.

To describe some implementations in greater detail, reference is first made to examples of hardware structures. FIG. 1 is a diagram of an example of an electronic computing and communication system 100. As used herein, the term 'electronic computing and communication system,' or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device, or combination of computing devices. In some implementations, the client 104 can be implemented as a single physical unit, or a combination of physical units. In some implementations, a single physical unit can include multiple clients.

In some implementations, the client 104 can be an instance of an application running on a customer device associated with the customer 102. As used herein, the term 'application' can include, but is not limited to, applications, programs, instances, processes, threads, services, plugins, patches, application version upgrades, and/or any other identifiable computational aspect. The system 100 can include any number of customers and/or clients and/or can have a different configuration of customers and/or clients than generally illustrated in FIG. 1. For example, and without limitation, the system 100 can include hundreds or thousands of customers and at least some of the customers can include and/or be associated with any number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as datacenter 108, can represent a geographic location, which can include a facility, where the one or more servers are located. The system 100 can include any number of datacenters and servers and/or can include a different configuration of datacenters and servers than generally illustrated in FIG. 1. For example, and without limitation, the system 100 can include tens of datacenters and at least some of the datacenters can include hundreds or any suitable number of servers. In some implementations, the datacenter 108 can be associated and/or communicate with one or more datacenter networks and/or domains, which can include domains other than the client domain.

In some implementations, the client 104 and the servers associated with the datacenter 108 are configured to connect to, or communicate via, a network 106. In some implementations, a client 104 associated with the customer 102 can connect to the network 106 via a communal connection point, link, and/or path. In some implementations, a client 104 associated with the customer 102 can connect to, or communicate via, the network 106 using a distinct connection point, link, and/or path. A connection point, link, or path can be wired, wireless, or a combination thereof.

In some implementations, the network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, and/or any combination thereof. The network 106, the datacenter 108, or any other element, or combination of elements, of the system 100 can include network hardware such as routers, switches, load balancers, other network devices, or combinations thereof. For example, datacenter 108 can include a load balancer 110 for routing traffic from network 106 to various servers associated with the datacenter 108.

The load balancer 110 can route, or direct, computing communication traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticking sessions, between a client and a service or application provided by the datacenter 108.

In some implementations, maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

In some implementations, the datacenter 108 includes an application server 112 and a database server 116. The application server 112 and/or the database server 116 can be a computing system, which can include one or more computing devices, such as a desktop computer, a server computer, or any other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. In some implementations, any number of applications servers or database servers can be implemented at the datacenter 108. In some implementations, the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the current database 118 of the database server 116.

In some implementations, the application server 112 can include any suitable number of application nodes depending upon a system load and/or other characteristics associated with the application server 112. For example, and without limitation, the application server 112 can include two or more nodes forming a node cluster. In some implementations, the application nodes implemented on a single application server 112 can run on different hardware servers. By way of example, in accordance with the present approach, an application server 112 can execute instructions to receipt and/or use of a resources by a client device 104 using web-based and non-web-based interfaces.

The database server 116 can be configured to store, manage, or otherwise provide data for delivering services to the client 104 over a network. In some implementations, the database server 116 includes a data storage unit, such as a current database 118, which can be accessible by an application executed on the application server 112. In some implementations, the current database 118 can be implemented as a relational database management system (RDBMS), an object database, an XML database, a configuration management database (CMDB), a management information base (MIB), one or more flat files, or the like or a combination thereof. By way of non-limiting example, the system 100, in some implementations, can include an XML database and a CMDB. While limited examples are described, the current databased 118 can be configured as and/or comprise any suitable database type. Further, the system 100 can include one, two, three, or any suitable number of databases configured as and/or comprising any suitable database type and/or combination thereof.

In some implementations, the database 118 can be configured as and/or comprise a CMDB. A CMDB can be comprised of a plurality of configuration items (CIs). ACI can be a CMDB record that representing an infrastructure entity, device, and/or units of the system 100. For example, the customer 102, the client 104, the network 106, the datacenter 108, the load balancer 110, the application server 112, the application node 114, the database server 116, the current database 118, or any other element, portion of an element, or combination of elements of the electronic computing and communication system 100 can be represented in the CMDB by a CI.

The CMDB can include information describing the configuration, the role, or both, of an element of the system 100. In some implementations, an MIB can include one or more databases listing characteristics of the elements of the system 100. In some implementations, an object identifier (OID) can represent object identifiers of objects or elements in the MIB.

In some implementations, one or more databases (e.g., the current database 118), tables, other suitable information sources, and/or portions or combinations thereof, can be stored, managed, or otherwise provided by one or more of the elements of the system 100 other than the database server 116, such as the client 104 and/or the application server 112.

Some or all of the systems and methods described herein can operate and/or be executed on or by the servers associated with the system 100. In some implementations, the systems and methods described herein, portions thereof, or combinations thereof, can be implemented on a single device, such as a single server, or a combination of devices, for example, a combination of the client 104, the application server 112, and the database server 116.

In some implementations, the system 100 can include devices other than the client 104, the load balancer 110, the application server 114, and the database server 116 as generally illustrated in FIG. 1. In some implementations, one or more additional servers can operate as an electronic computing and communication system infrastructure control, from which servers, clients, and/or both, can be monitored, controlled, configured, or a combination thereof.

In some implementations, the network 106, one or more datacenters, such as the datacenter 108, and one or more load balancers, such as the load balancer 110, can be implemented within a distributed computing system. In some implementations, a load balancer associated with a distributed computing system (e.g., the load balancer 110) can communicate with the network 106, one or more datacenters (e.g., the datacenter 108), other load balancers, or a combination thereof. In some implementations, the load balancer 110 can be configured to route communications to a primary datacenter, identify a failover condition (i.e., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the current database 118, and the secondary datacenter can include a secondary database. In some implementations, the secondary database can include an exact or substantially exact mirror, copy, or replication of the primary database. In some implementations, the primary database and/or the secondary database can be implemented as a relational database management system (RDBMS), an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database, and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations performed directly on the secondary database. In the event a failover condition associated with the primary database is identified, the secondary database can operate as the primary database and can allow read and/or write access to data. The primary database can then operate as the secondary database, mirror the new primary database, and prevent direct write access to the new secondary database.

In some implementations, a distributed computing system can allocate resources of a computer network using a multi-tenant or single-tenant architecture. Allocation of resources in a multi-tenant architecture can include installations and/or instantiations of one or more servers, such as application servers, database servers, and/or any other server, or combination of servers, that can be shared amongst multiple customers. For example, a web server, such as a unitary Apache installation, an application server, such as a unitary Java Virtual Machine, a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof, can be provisioned for at least some customers, and/or customer sub-units. In some implementations, customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof, can be installed on the same physical server. An installation can be allocated a portion of the physical server resources, such as RAM, storage, communications bandwidth, and/or processor cycles.

In some implementations, a customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2:
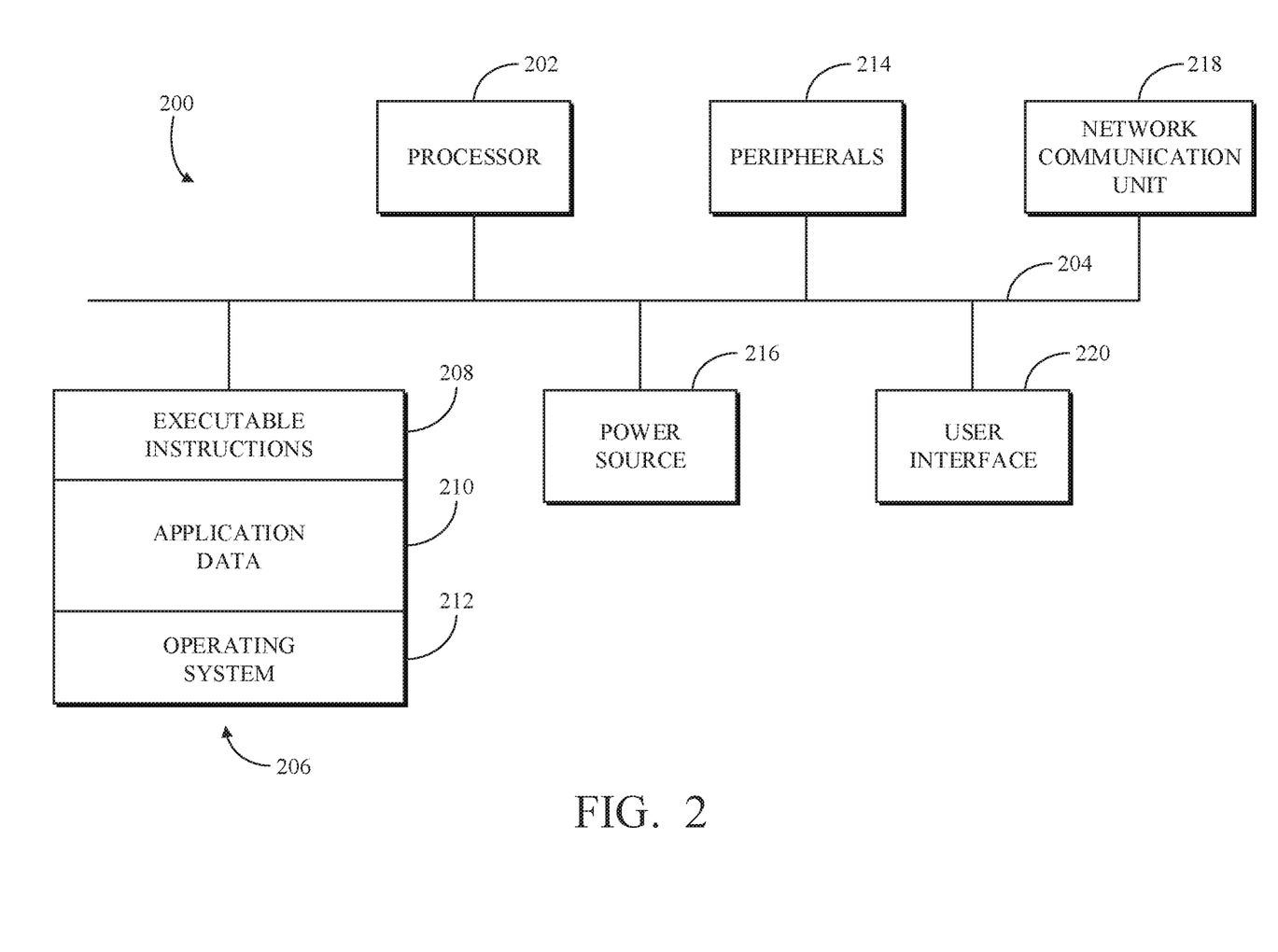
FIG. 2 is a block diagram of an example internal configuration of a computing device of the electronic computing and communication system shown in FIG. 1.

FIG. 2 generally illustrates a block diagram of an example internal configuration of a computing device 200, such as a client 104 and/or a server, such as an application server 112 and/or a database server 116, of the electronic computing and communication system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices.

A computing device 200 can include components and/or units, such as a processor 202, a bus 204, a memory 206, peripherals 214, a network communication unit 218, a power source 216, a user interface 220, other suitable components and/or any combination thereof.

The processor 202 can be a central processing unit (CPU), such as a microprocessor, and can include single or multiple processors, having single or multiple processing cores. Alternatively, the processor 202 can include another type of device, or multiple devices, capable of manipulating or processing information now-existing or hereafter developed. For example, the processor 202 can include multiple processors interconnected in any manner, including hardwired and/or networked, including wirelessly networked. In some implementations, the operations of the processor 202 can be distributed across multiple physical devices and/or units that can be coupled directly or across a local area or other network. In some implementations, the processor 202 can include a cache, or cache memory, for local storage of operating data and/or instructions. The operations of the processor 202 can be distributed across multiple machines which can be coupled directly or across a local area or other network.

In some implementations, the memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or any form of non-volatile memory capable of persistent electronic information storage, such as in the absence of an active power supply. In some implementations, the memory 206 can include another type of device, or multiple devices, capable of storing data and/or instructions for processing by the processor 202, now-existing or hereafter developed. The processor 202 can access and/or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple machines such as network-based memory or memory in multiple machines performing the operations of clients and/or servers.

The memory 206 can include executable instructions 208, data, such as application data 210, an operating system 212, or a combination thereof, for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof, to perform various functions described herein. For example, the executable instructions 208 can include instructions to determine whether a client provides native support for a requested resource and/or to provide a usable form of a requested resource to a client in response to a resource request (e.g., via a user interface component). The application data 210 can include, for example, user files, database catalogs and/or dictionaries, configuration information or functional programs, such as a web browser, a web server, a database server, and/or a combination thereof. The operating system 212 can be, for example, Microsoft Windows®, Mac OS X®, Linux®, or an operating system for a small device, such as a smart phone or tablet device, or a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the device 200 itself and/or the environment around the device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200 as can be contemplated. In some implementations, a client and/or server can omit the peripherals 214. In some implementations, the power source 216 can be a battery, and the computing device 200 can operate independently of an external power distribution system. Any of the components of the computing device 200, such as the peripherals 214 or the power source 216 can communicate with the processor 202 via the bus 204. Although depicted here as a single bus, the bus 204 can be composed of multiple buses, that can be connected to one other through various bridges, controllers, and, or adapters.

The network communication unit 218 can also be coupled to the processor 202 via the bus 204. In some implementations, network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display, a positional input device, such as a mouse, touchpad, touchscreen, or the like, a keyboard, and/or any other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display, such as an OLED display, or other suitable display.

Figure 3:
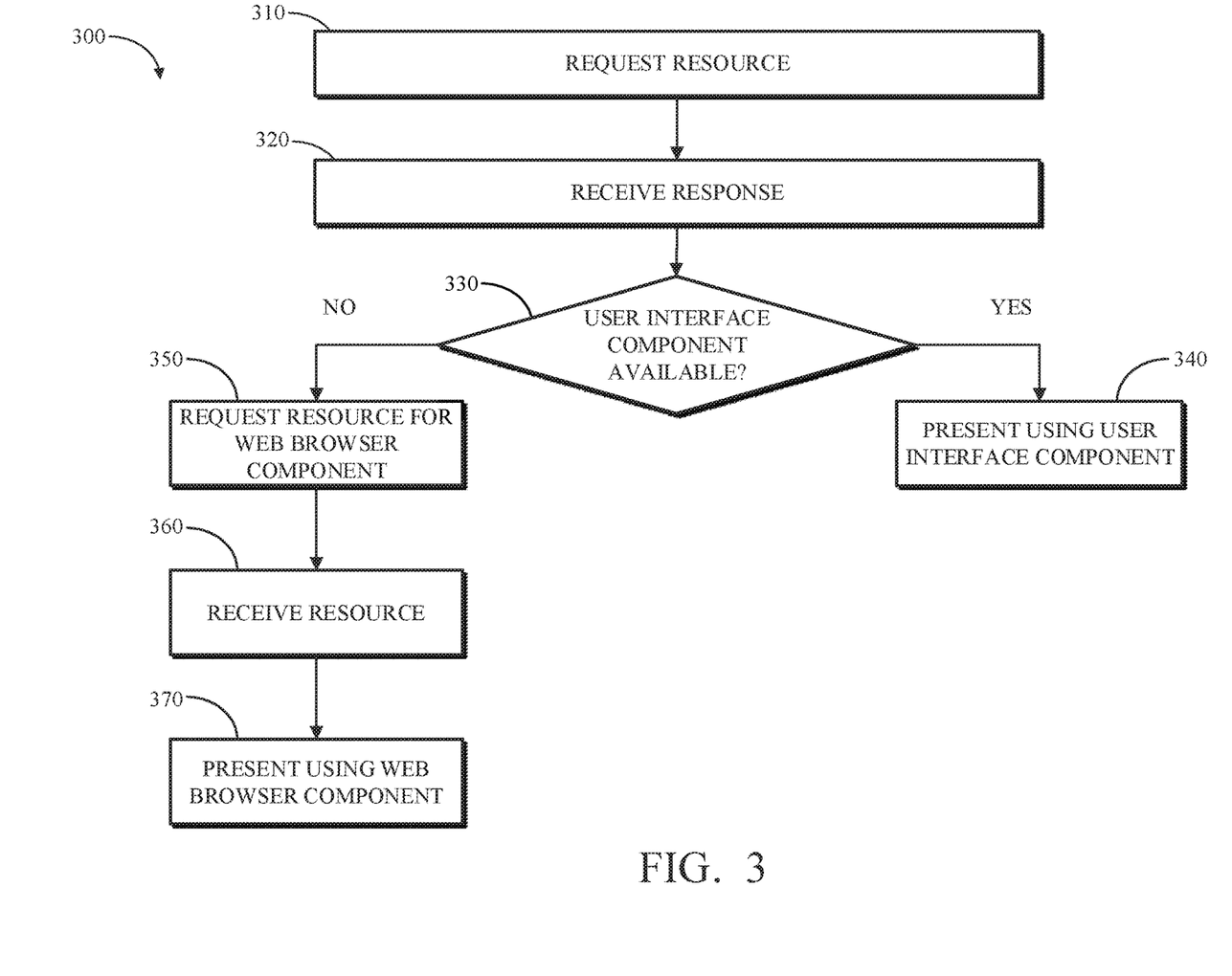
FIG. 3 is a flowchart illustrating an example of resource presentation in accordance with implementations of this disclosure.

FIG. 3 is a flowchart of an example of resource presentation 300 in an electronic computing and communication system, such as the system 100 of FIG. 1, in accordance with implementations of this disclosure. In some implementations, resource presentation 300 may be implemented within a client (e.g., a mobile device), such as the client 104 shown in FIG. 1, a datacenter, such as the datacenter 108 shown in FIG. 1, or a combination thereof, and may involve the operation of one or more computing devices, such as the computing device 200 shown in FIG. 2. For example, resource presentation 300 can be performed by executing one or more machine-readable programs or other computer executable instructions, such as instructions or programs coded in JavaScript, C, or other such instructions, by one or more computing devices of the electronic computing and communication system.

Resource presentation 300, or any other method, process, or algorithm described in connection with the implementations disclosed herein, can be implemented directly in software executed by hardware and/or circuitry, in hardware, in firmware, or in a combination thereof. Resource presentation 300, or any other method, process, or algorithm described in connection with the implementations disclosed herein can be implemented or used by executing one or more machine-readable programs, or other computer executable instructions, by hardware, circuitry, firmware, or a combination thereof using one or more computing devices of the electronic computing and communication system. For example, resource presentation 300 can be implemented in a mobile device application (e.g., an "app") that can be installed on a mobile device (e.g., the client) using, for example, an app store. Resource presentation 300 improves the one or more computing devices and/or the computing system by improving the efficiency, accuracy, or both, of communicating information, presenting information, processing information, storing information, or a combination thereof, by the one or more computing devices and/or the computing system.

In the depicted example, resource presentation 300 may include requesting a resource at 310, receiving a response at 320, identifying an available user interface component at 330, presenting the resource via the user interface component at 340, requesting the resource for presentation by a web browser component at 350, receiving the resource for presentation by a web browser component at 360, presenting the resource via the web browser component at 370, or a combination thereof. Although elements of resource presentation 300 are shown in a particular sequence for clarity, aspects of the systems and methods described herein may be performed in various orders and/or concurrently, may be performed with other operations not presented and described herein, and one or more aspect of the systems and methods described herein may be omitted.

As shown in FIG. 3, a client may request a resource at operation 310. For example, a client, such as the client 104 shown in FIG. 1, may include a process or thread executing on a computing device, such as the computing device 200 shown in FIG. 2, and may generate and send a message, such as a resource request message, to a server or other data source, such as the application server 112 or the database server 116, within a datacenter, such as the datacenter 108. The message may indicate a request for a resource (e.g., web page, web application, or the like), and may include a first indicator (e.g., URL) of the requested resource.

In some implementations, the client may transmit the request for the resource in response to input, such as user input. For example, the client may receive a user input requesting a resource, such as a mouse click, button press, or tap, on an element of a user interface representing the requested resource, such as on a link representing the URL corresponding to the requested resource. In some implementations, the client may receive the user input from a user interface component associated with the resource, from a user interface component unassociated with the requested resource, from a web browser component, or from any other application, process, or thread of the client.

For example, a process, application, or thread executing on a computing device (the client) may transmit a request for a resource by sending, to a server or other remote data source, a URL, such as a platform-independent URL, which may be expressed as the following:

HTTPS://instance.domain.com/path/param=value. (Example 1)

As shown in Example 1, the URL may include a combination of distinct information elements. For example, a URL may include a protocol information element, such as "HTTP," indicating the HyperText Transfer Protocol, or "HTTPS," indicating the secure HyperText Transfer Protocol, as shown. Other protocols, such as the File Transfer Protocol (FTP) or the Real-time Transport Protocol (RTP), may be used. An URL may include a routing or domain information element, such as "instance.domain.com" as shown in Example 1. In some implementations, the domain information element may be a customer-specific information element. For example, a client of a customer may transmit a URL including a customer-specific domain information element, such as "customer1.domain.com," and a client of another customer may transmit a different URL including a different customer-specific domain information element, such as "customer2.domain.com." An URL may include a path information element, such as "path" as shown in Example 1. Although not shown expressly in Example 1, the path information element may identify, or partially identify, the requested resource, within the domain indicated by the domain information element. For example, the requested resource may be an image stored on the server in the "jpg" format, and the path may be "image.jpg." In another example, the requested resource may be the output or result of an operation performed by the server, and the path may indicate the operation, or a component of the server configured to perform the operation, such as "incident.do" or "incident.asp". An URL may include one or more parameter information elements, such as "param=value" as shown in Example 1, which may identify, or partially identify, the requested resource, in combination with the domain indicated by the domain information element and the path information element.

In some implementations, the resource request may include other information instead of or in addition to the URL. For example, the resource request may include metadata, or other information, such as information identifying the platform requesting the resource. For example, the request may include information indicating that the client requesting the resource is a computing device, and may indicate a platform of the computing device.

Figure 4:
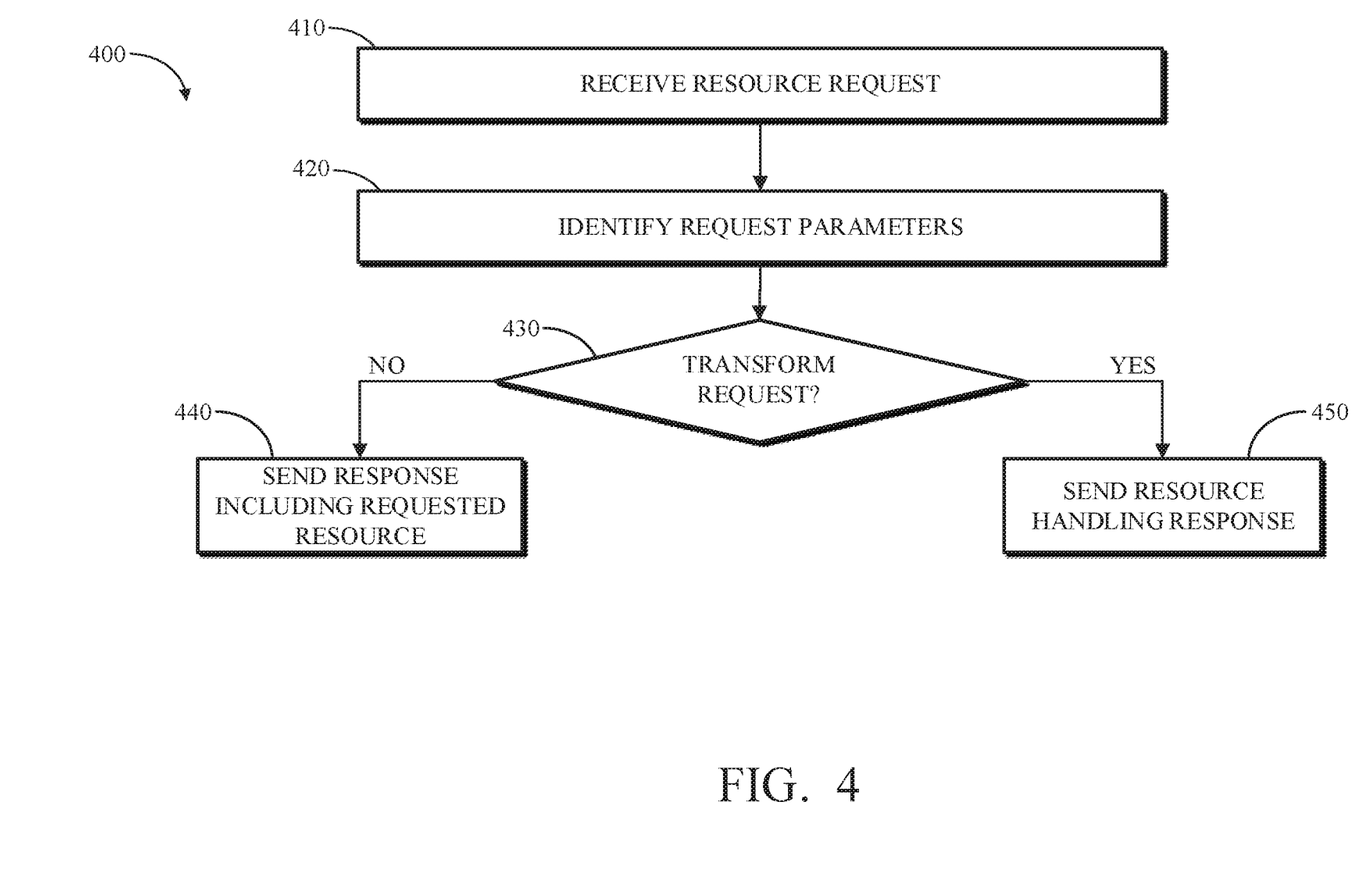
FIG. 4 is a flowchart of an example of resource presentation in an electronic computing and communication system in accordance with implementations of this disclosure.

Although not shown separately in FIG. 3, a server, or other remote data source, may receive the resource request sent at 310 and may send the requested resource, or a portion thereof, or may send a response, to the client, as shown in FIG. 4.

The client may receive a response at 320. For example, the process or thread that requested the resource at 310, or another process or thread executing on the client, may receive the response at 320. Receiving the response may include receiving a message, which may include the response, from the server in response to transmitting the resource request at 310.

The response may include a second indicator (e.g., a URL or other structured data) of the requested resource, which may differ from the first indicator of the requested resource sent with the request for the resource at 310. In some implementations, the second indicator of the requested resource may identify a different resource corresponding to the requested resource.

In some implementations, the response may include other information, such as structured data, such as JSON structured data, which may indicate and/or include the requested resource, an indication of the resource type or class for the requested resource, which may include respective indications of antecedent resource types or classes for the resource type or class.

In some implementations, the response may include a response URL, or a portion thereof, which may differ from the requested URL, identifying a different resource corresponding to the requested resource, which may indicate a resource type or class for the requested resource, and may indicate zero or more antecedent resource types or classes for the resource type or class. For example, the response may include structured data that includes a response URL. In another example, the response may be a redirect message that includes a response URL. In an example, the request for the resource at 310 may include an URL, such as the URL shown in Example 1, and the response received at 320 may include a response URL, or a portion thereof, such as the following:

$m.do/form/incident. (Example 2)

An available user interface component may be identified at 330. Identifying an available user interface component at 330 may include parsing, or otherwise evaluating, the second indicator of the requested resource indicated by the response received at 320. For example, the second indicator of the requested resource may include a response URL, such as the response URL shown in Example 2, and the client may generate a data structure based on the response URL. In another example, the response may include structured data, such as JSON structured data, which may include the requested resource, an indication of the resource type or class for the requested resource, which may include respective indications of antecedent resource types or classes for the resource type or class, the response URL, or a combination thereof, and the client may read the structured data from the response.

Identifying an available user interface component at 330 may include evaluating a registry, or other listing, of available user interface components for the client, which may include information indicating one or more associations between available user interface components and resource classes or types, or other resource identifying information. For example, the client may identify a resource class or type in the structured data included in, or generated based on, the response, and may identify an available user interface component based on registry information associating the available user interface components with the resource class or type.

In some implementations, the client may determine whether a user interface component is available based on the indication of the resource type or class, which may include determining whether a user interface component is available based on the respective indications of antecedent resource types or classes for the resource type or class, included in the response. For example, the client may determine that the indicator of the requested resource indicates a resource type or class, such as the "incident" resource type or class, and may determine that a user interface component for the "incident" resource type or class is unavailable, and the client may determine that the second indicator of the requested resource indicates an antecedent resource type or class, such as the "form" resource type or class, and may determine that a user interface component for the "form" resource type or class is available.

In some implementations, a representation of the resource may be presented at the client via the user interface component at 340. For example, the client may identify an available user interface component at 330, and may pass the resource request to the user interface component, which may include instantiating an instance of the user interface component, communicating with a previously instantiated instance of the user interface component, or otherwise controlling the user interface component. For example, the process or thread that requested the resource at 310, the process or thread that received the response at 320, or another process or thread executing on the client, may instantiate or call the user interface component at 330.

In some implementations, instantiating or calling the user interface component at 330 may include passing the second indicator of the requested resource indicated by the response received at 320 to the user interface component. In some implementations, the second indicator of the requested resource indicated by the response received at 320 may include the requested resource and the user interface component may present a representation of the requested resource received at 320.

In some implementations, the client may determine that a user interface component for the requested resource is unavailable at 330, and the client may send a request for the resource for web-based presentation at 350. For example, the client may determine that a user interface component for the requested resource is unavailable at 330, and the process or thread that requested the resource at 310, the process or thread that received the response at 320, or another process or thread executing on the client, may send the request for the resource for presentation by a web browser component at 350. In another example, the client may determine that a user interface component for the requested resource is unavailable at 330, and the process or thread that requested the resource at 310, the process or thread that received the response at 320, or another process or thread executing on the client, may pass the resource request to a web browser component, which may include instantiating an instance of the web browser component or communicating with a previously instantiated instance of the web browser component, and the web browser component may send the request for the resource for web-based presentation at 350.

In some implementations, sending the request for the resource for presentation by a web browser component at 350 may include generating a third indicator of the requested resource based on the second indicator received at 320, and including the third indicator in the request for the resource for web-based presentation sent at 350. For example, the third indicator of the requested resource based on the second indicator shown in Example 2 may be expressed as the following:

HTTPS://instance.domain.com/$mobileWebView/form/incident/identifier (Example 3)

Although not shown in Example 3, in some implementations, one or more portions of the first indicator of the requested resource, or the second indicator of the requested resource, or both, may be included in the third indicator of the requested resource. For example, parameters, such as "param=value" as shown in Example 1, may be included in the third indicator of the requested resource.

In some implementations, the client may receive the resource for presentation by a web browser component at 360 in response to sending the request for the resource for web-based presentation at 350. For example, the process or thread that sent the request for the resource for web-based presentation at 350, or another process or thread executing on the client, may receive the resource for web-based presentation at 360.

In some implementations, the client may present a representation of the resource received for web-based presentation at 360 via the web browser component at 370. For example, sending the request for the resource for web-based presentation at 350, or receiving the resource for web-based presentation at 360, may include instantiating an instance of the web browser component, communicating with a previously instantiated instance of the web browser component, or otherwise controlling the web browser component, and the web browser component may present a representation of the resource at 370.

In some implementations, the first indicator of the requested resource may differ from the second indicator of the requested resource and the third indicator of the requested resource, and the second indicator of the requested resource may differ from the third indicator of the requested resource. For example, a resource type or class may be unidentifiable by the client based on the first indicator of the requested resource, and may be identifiable by the server based on the first indicator of the requested resource, a resource for native presentation may be included with or indicated by the second indicator of the requested resource, and a resource for web-based presentation may be indicated by the third indicator of the requested resource.

In some implementations, the first indicator of the requested resource may indicate a resource that is not optimized for presentation by the client platform, and presentation of a representation of the resource indicated by the first indicator of the requested resource via the client may be inefficient or erroneous, or the resource indicated by the first indicator of the requested resource may be unpresentable by the client. In some implementations, the first indicator may be associated with a web browser component.

In some implementations, the second indicator of the requested resource may indicate a resource for presentation by a user interface component of the client platform, and presentation of a representation of the resource indicated by the second indicator of the requested resource via the user interface component of the client may be efficient.

In some implementations, the third indicator of the requested resource may indicate a resource for presentation by a web browser component of the client platform, and presentation of a representation of the resource indicated by the third indicator of the requested resource via the web browser component of the client may be more efficient than presentation of a representation of the resource indicated by the first indicator of the requested resource via the client and may be less efficient than presentation of a representation of the resource indicated by the second indicator of the requested resource via the user interface component of the client. For example, the resource indicated by the third indicator of the requested resource may include a portion of the resource indicated by the first indicator of the requested resource.

Although resource presentation 300 is shown as a series of operations for clarity, implementations of resource presentation or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

For example, in some implementations, the client device can be configured to parse, or otherwise evaluate, the first indicator or resource request and determining whether a defined user interface component is associated with the requested resource, or with a resource type or class of the requested resource, before sending the resource request at 310. For example, the client device may parse the request URL, or other information associated with the request, and may identify a path information element for the requested resource. In some implementations, the path information element may indicate a resource type or class for the requested resource. For example, the path information element may be, or may include, "$chat.do", which may be associated with a user interface component, such as a native chat component, defined at the client. In another example, the client device may identify a cached response corresponding to the request URL, or a portion thereof, such as a cached response stored in a cache of the client device, indicating an association between the request URL, or the portion thereof, and a user interface component. In some implementations, in response to determining that the requested resource is associated with a user interface component defined at the client, the client may present the requested resource using the defined user interface component at 340 without executing operations 310 or 320.

When user interface component operation 340 is reached without receiving resource information needed to present the resource using a user interface component, resource presentation 300 may include sending a user interface resource request for the resource information. For example, in addition to the previous example, in some implementations, the second indicator of the requested resource indicated by the response received at 320 may omit the requested resource. For example, such as described previously, the response may include structured information about the resource, but not the resource itself.

A user interface resource request may be similar to the resource request sent at 310, except that it may be sent by, or on behalf of, the user interface component, and may be based on the second indicator of the requested resource. For example, the second resource request may include a response URL, such as the response URL shown in Example 2. The user interface component may receive a response to the user interface resource request, which may include the requested resource indicated by the user interface resource request, and may present a representation of the requested resource, or a portion thereof. In some implementations, one or more portions of the first indicator of the requested resource may be included in the second indicator of the requested resource. For example, protocol information, such as "HTTPS://" as shown in Example 1, routing information, such as "instance.domain.com" as shown in Example 1, parameters, such as "param=value" as shown in Example 1, or a combination thereof may be included in the second indicator of the requested resource.

FIG. 4 is a flowchart of an example of resource presentation 400 in an electronic computing and communication system, such as the system 100 of FIG. 1, in accordance with implementations of this disclosure. In some implementations, resource presentation 400 may be implemented within a datacenter, such as the datacenter 108 shown in FIG. 1, and may include using one or more computing devices, such as the computing device 200 shown in FIG. 2. For example, resource presentation 400 can be performed by executing one or more machine-readable programs or other computer executable instructions, such as instructions or programs described according to JavaScript, C, or other such instructions, by one or more computing devices of the electronic computing and communication system.

Resource presentation 400, or any other method, process, or algorithm described in connection with the implementations disclosed herein, can be implemented directly in software executed by hardware and/or circuitry, in hardware, in firmware, or in a combination thereof. Implementing resource presentation 400, or any other method, process, or algorithm described in connection with the implementations disclosed herein, in an electronic computing and communication system by executing one or more machine-readable programs, or other computer executable instructions, by hardware, circuitry, firmware, or a combination thereof, of one or more computing devices of the electronic computing and communication system, improves the operation of the one or more computing devices and/or the computing system by improving the efficiency, accuracy, or both, of communicating information, presenting information, processing information, storing information, or a combination thereof, by the one or more computing devices and/or the computing system.

Resource presentation 400 may include receiving a resource request at 410, identifying request parameters at 420, determining whether to transform the request at 430, sending the requested resource at 440, sending a response at 450, or a combination thereof. Although elements of resource presentation 400 are shown sequentially for clarity, aspects of the systems and methods described herein may be performed in various orders and/or concurrently, may be performed with other operations not presented and described herein, and one or more aspect of the systems and methods described herein may be omitted.

As shown in FIG. 4, a server, or other data source, may receive a resource request at 410, such as the resource request sent by the client as indicated at 310 in FIG. 3. The received resource request may include request parameters, such as an indication of the requesting platform, an indicator of the requested resource, or a combination thereof. For example, the indicator of the requested resource may be a URL, such as the URL shown in Example 1.

As shown in FIG. 4, the server may identify the request parameters at 420. One or more of the request parameters may be identified based on the resource request, such as in response to receiving the resource request at 410. Identifying the request parameters based on the resource request may include reading, parsing, or otherwise evaluating, the resource request to identify the request parameters. For example, the server may identify platform information, an indicator of the requested resource, a component associated with the indicator of the requested resource, a path for the requested resource, a resource type or class for the requested resource, or a combination thereof, as request parameters.

Identifying platform information, such as device type information, user agent information, or other information included with the resource request, may include identifying platform information that identifies the requesting platform, or one or more aspects thereof. For example, the server may determine that the requesting device (the client) is a desktop computer, or an application, module, process, or thread, executing on a desktop computer, such as a web browser executing on a desktop computer. In another example, the server may determine that the requesting device (the client) is a mobile device, or an application, module, process, or thread, executing on a mobile device, such as a web browser executing on a mobile device.

Identifying the request parameters may include identifying a path, which may include an indicator of the requested resource, based on the resource request. For example, the server may parse the request URL, or other information included with the request, and may identify a portion of the URL as the path, such as the path portion of the URL shown in Example 1. In some implementations, the server may identify a resource type or class for the requested resource based on the indicator of the requested resource.

Based upon the identified request parameters, one or more data sources may be evaluated to identify a resource type or class for the requested resource. For example, the server, or other remote data source, may evaluate a database, or other data storage unit, and may determine that the database includes a table corresponding to the path indicated in the resource request. For example, the path may be, or may include, "incident.do", the server may determine that a database associated with the resource request includes an "incident" table, the server may identify "incident" as a resource type or class for the requested resource, and the server may determine that the requested resource type or class, "incident," is related to a "form" antecedent resource type or class. For example, a table in the database, or other data storage unit accessible by the server, may indicate the relationship between the "incident" table and the "form" antecedent resource type or class. In another example, the resource request may include an indication of a module, or other server function, and the server may evaluate the module to identify the resource type or class information. For example, the path information in the resource request may include "incident.do," which may indicate an "incident" module, such as an "incident.do" file stored at, or accessible by, the server, and the server may evaluate the "incident" module to identify an indication of the resource type or class, such as via an API.

The identified request parameters allow the identification of a component associated with the indicator of the requested resource. For example, the indicator of the requested resource may include "incident.do," and the server identify a desktop computer browser as the component associated with the indicator of the requested resource.

The server may determine whether to transform the resource request at 430. Determining whether to transform the resource request may be based on one or more of the request parameters identified at 420. For example, the requesting platform identified at 420 may be a desktop computer, the component associated with the indicator of the requested resource may be a user interface component for desktop computers, and the server may determine that transforming the resource request may be omitted. In another example, the requesting platform identified at 420 may be a mobile device, the component associated with the indicator of the requested resource may be a web browser component for mobile devices, and the server may determine that transforming the resource request may be performed.

The server may send a response including the requested resource, or a portion thereof, to the client at 440, such as in response to determining that transforming the resource request may be omitted at 430. Transmitting the response including the requested resource, or a portion thereof, to the client at 440 may include sending the requested resource, or the portion thereof, for access, presentation, processing, storage, or a combination thereof, by the component associated with the indicator of the requested resource.

The server may generate and send a response to the client at 450, which may include transforming the resource request, such as in response to determining that transforming the resource request may be performed at 430.

Transforming the resource request may include generating an indicator (e.g., second indicator), such as a response URL, which may differ from the requested URL, and which may indicate a resource corresponding to the requested resource, which may differ from the requested resource. The second indicator, or a portion thereof, may include a resource type or class for the requested resource, and may indicate zero or more antecedent resource types or classes for the resource type or class. The resource type or class may be associated with a component that may be a user interface component for the requesting platform. Transforming the resource request may include generating an indication of the identified resource type or class, an indication the identified antecedent resource type or class, or a combination thereof. In some implementations, an antecedent resource type or class may have an antecedent resource type or class.

The server may generate a message including the response indicating the second indicator of the requested resource. For example, the server may include structured data, which may be JSON structured data, and which may include the second indicator of the requested resource, the requested resource, an indication of the resource type or class for the requested resource, which may include respective indications of antecedent resource types or classes for the resource type or class, or a combination thereof, in the response. In another example, the second indicator of the requested resource may be a redirect response.

In some implementations, the request for the resource received at 410 may include a URL, such as the URL shown in Example 1, and the response may include a response URL, or a portion thereof, such as the following:

$m.do/form/incident. (Example 4)

In some implementations, a client-side communication framework can be provided to facilitate the use of user interface components and web browser components in an app executed on a mobile device. Such a framework can be used to combine the use of user interface components and web browser components. The user interface components and web browser components may have differing user interface elements and characteristics, which may be apparent to a user of a mobile device. Such a framework may be used to selectively use user interface components and web browser components in such a way to provide a better user experience.

In some implementations, the client-side communication framework can include a WebView module, a Manager module, and a Plugin module. The Web View module can be configured as an interface for communications between user interface components and web browser components, such as by using a JavaScript interface. The JavaScript interface, for example, can include a set of API calls which cause messages to be sent to the Manager module, and can include functionality for firing JavaScript events such as when messages are received from the Plugin module. The Manager module can be configured to receive messages from the WebView module for user interface components and can be configured to instantiate or invoke execution of a plugin including a user interface component using the Plugin module. The Manager module can be configured to permit plugins to register to allow for the addition, removal, and updating of plugins and associated user interface components. For example, plugins can include user interface components relating to photo capture, attachments, barcode reading, forms, lists, location, signature capture, or a combination thereof.

In some implementations, when the WebView module is executed, available plugins can register with the Manager module. A user interface component can be invoked, such as from a web browser component, by way of a JavaScript interface with the WebView module. For example, a function can be configured to invoke a form user interface component. The function call can cause a message to be sent to the Manager module, which can, responsive to the message, invoke the user interface component. The message can, for example, include arguments or parameters that can be used to configure or invoke the user interface component. The user interface component can communicate with the WebView module to pass information from the user interface component to web browser components and to generate events, such as when the user interface component stops executing.

All or a portion of aspects of the systems and methods described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's can contain other general or special purpose blocks as well. An example FPGA can be programmed based on a hardware definition language (HDL) design, such as VHSIC Hardware Description Language or Verilog.

The embodiments herein can be described in terms of functional block components and various processing operations. Such functional blocks can be realized by any number of hardware and/or software components that perform the specified functions. For example, the described embodiments can employ various integrated circuit components, e.g., memory elements, processing elements, logic elements, look-up tables, and the like, which can carry out a variety of functions under the control of one or more microprocessors or other control devices. Similarly, where the elements of the described embodiments are implemented using software programming or software elements the systems and methods can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the embodiments of the systems and methods could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and methods and are not intended to otherwise limit the scope of the systems and methods in any way. For the sake of brevity, conventional electronics, control systems, software development and other functional aspects of the systems (and components of the individual operating components of the systems) cannot be described in detail. Furthermore, the connecting lines, or connectors shown in the various figures presented are intended to represent exemplary functional relationships and/or physical or logical couplings between the various elements. Many alternative or additional functional relationships, physical connections or logical connections can be present in a practical device.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if individual references were individually and specifically indicated as incorporated by reference and were set forth in its entirety herein.

The above-described embodiments have been described in order to allow easy understanding of the present systems and methods and do not limit the present systems and methods. To the contrary, the systems and methods is intended to cover various modifications and equivalent arrangements included within the scope of the appended claims, which scope is to be accorded the broadest interpretation so as to encompass all such modifications and equivalent structure as is permitted under the law.

What is claimed is:

1. A method comprising:
   transmitting, via an application running on a mobile device, a request that includes a uniform resource locator (URL) associated with a requested resource, wherein the URL does not indicate a resource type of the requested resource;
   receiving, via the application, a response to the transmission of the URL;
   identifying, via the application, the resource type of the requested resource based on the received response;
   presenting the requested resource using a user interface of the application when the identified resource type is capable of being presented by the user interface without reliance on a web browser of the mobile device that is distinct from the application; and
   presenting the requested resource using the web browser of the mobile device when the identified resource type is not capable of being presented using the user interface of the application.

2. The method of claim 1, wherein the request is transmitted to a server device communicatively coupled to the mobile device, and wherein the response is received from the server device.

3. The method of claim 1, wherein the resource type includes an antecedent resource type, and wherein the user interface of the application is used to present the requested resource when the antecedent resource type of the identified resource type is capable of being presented by the user interface without reliance on the web browser of the mobile device.

4. The method of claim 1, wherein presenting the requested resource using the user interface of the application running on the mobile device comprises:
   transmitting a second request having data included in the response;
   receiving a portion of the requested resource sent in response to the second request; and
   presenting a representation of the portion of the requested resource using the user interface.

5. The method of claim 1, further comprising:
   receiving, via the application, a second URL of a second requested resource as part of the response;
   identifying, via the application, a second resource type of the second requested resource using the second URL before transmitting a request to a server for the second requested resource;
   presenting the second requested resource using the user interface of the application when the identified resource type is capable of being presented by the user interface without reliance on the web browser of the mobile device; and
   presenting the requested resource using the web browser used of the mobile device when the identified resource type is not capable of being presented using the user interface of the application.

6. The method of claim 1, wherein the received response includes a portion of the requested resource and wherein presenting the requested resource includes using the portion of the requested resource.

7. The method of claim 1, comprising determining, via the application, that the requested resource is not capable of being presented by the user interface based on the identified resource type, and, in response, transmitting a request for the requested resource in a format capable of being presented using the web browser of the mobile device.

8. The method of claim 1, wherein the response does not include the requested resource.

9. The method of claim 8, comprising:
   transmitting a second request that includes data from the response; and
   receiving a second response comprising the requested resource.

10. The method of claim 1, wherein the user interface comprises native user interface elements configured to present the requested resource within the application.

11. The method of claim 10, wherein the resource type comprises a form resource type, and wherein the native user interface elements comprise data entry user interface elements configured to enable modification of fields associated with a database record.

12. A non-transitory computer-readable storage medium, storing instructions of an application executable by a processor of a mobile device, the instructions, comprising:
   instructions to transmit, from the mobile device, a request including a uniform resource locator (URL) associated with a requested resource, wherein the URL does not indicate a resource type of the requested resource;
   instructions to receive a response to the transmission of the URL, wherein the response comprises data usable by the mobile device to identify a resource type indicative of the requested resource;
   instructions to present the requested resource using a user interface of the application when the identified resource type is capable of being presented by the user interface without reliance on a web browser of the mobile device that is distinct from the application; and
   instructions to present the requested resource using the web browser of the mobile device when the identified resource type is not capable of being presented using the user interface of the application.

13. The non-transitory computer-readable storage medium of claim 12, comprising instructions to identify the resource type from the response, wherein the resource type is not identifiable by the processor of the mobile device from the URL associated with the requested resource.

14. The non-transitory computer-readable storage medium of claim 12, comprising:
   instructions to identify an antecedent resource type of the requested resource; and
   instructions to present the requested resource using the web browser of the mobile device when the antecedent resource type of the identified resource type is capable of being presented by the user interface without reliance on the web browser of the mobile device.

15. The non-transitory computer-readable storage medium of claim 12, wherein the instructions to present the requested resource using the user interface comprise:
   instructions to transmit a second request having data included in the response received in response to the transmission of the URL;
   instructions to receive a portion of the requested resource in response to the second request; and
   instructions to present a representation of the portion of the requested resource using the user interface via a platform-specific technique associated with the mobile device.

16. The non-transitory computer-readable storage medium of claim 12, comprising:
   instructions to receive a second URL of a second requested resource as part of the response;
   instructions to identify a second resource type of the second requested resource based on the second URL;
   instructions to transmit a request to a server for the second requested resource based on the second URL;
   instructions to present the second requested resource using the user interface when the identified second resource type is capable of being presented by the user interface without reliance on web browser functionality provided on the mobile device; and
   instructions to present the second requested resource using the web browser when the identified second resource type is not capable of being presented using the user interface.

17. The non-transitory computer-readable storage medium of claim 12, wherein the received response includes only a portion of the requested resource and wherein presenting the requested resource includes displaying the portion of the requested resource.

18. A method comprising:
   receiving, at a processor of a server, a request for a resource from an application being executed by a remote device, wherein the request includes a first uniform resource locator (URL) associated with the requested resource, and wherein the first URL does not indicate a resource type associated with the requested resource;
   determining, based on the request, a resource type of the requested resource from a database communicatively coupled to the server;
   determining, based on the request and the resource type, a second URL associated with the requested resource, wherein the second URL indicates the resource type of the requested resource; and
   transmitting a response to the remote device that includes the second URL, wherein the remote device is configured to:
      identify the resource type of the requested resource based on the response;
      present the requested resource using a user interface of the application when the application is capable of presenting the identified resource type; and
      present the requested resource using a web browser of the remote device that is distinct from the application when the application is not capable of presenting the identified resource type.

19. The method of claim 18, further comprising:
   receiving a second request from the application being executed by the remote device, wherein the second request includes the second URL; and
   transmitting at least a portion of the requested resource to the remote device in response to receiving the second request.

20. The method of claim 18, wherein the response includes at least a portion of the requested resource.

21. The method of claim 18, wherein the first URL and the second URL are associated with a version of the requested resource capable of being presented by the user interface of the application of the remote device.

22. The method of claim 18, wherein determining the second URL comprises:
   determining, based on the request, a platform associated with the remote device;
   determining, based on the platform of the remote device and the resource type of the requested resource, whether the user interface of the application is capable of presenting the requested resource; and
   determining the second URL, wherein the second URL is associated with a different version of the requested resource that is capable of being presented by the web browser of the remote device.

23. The method of claim 18, wherein determining the resource type associated with the requested resource comprises determining an antecedent resource type associated with the requested resource, and wherein determining the second URL comprises determining the second URL based on the antecedent resource type associated with the requested resource.

24. The method of claim 18, wherein the resource type comprises a form resource type.

25. The method of claim 18, wherein the user interface is configured to use one or more platform-specific features of the remote device to present the requested resource.

26. The method of claim 18, wherein the resource type comprises an incident resource type, a chat resource type, a web application page resource type, a web service endpoint resource type, a script file resource type, an image file resource type, or a video file resource type.

27. A non-transitory computer-readable storage medium storing instructions executable by a processor of a server, the instructions comprising:
　　instructions to receive a request for a resource from an application running on a remote device, wherein the request includes a first uniform resource locator (URL) that is associated with a requested resource and that does not indicate a resource type associated with the requested resource;
　　instructions to determine, based on the request, a resource type of the requested resource from a database communicatively coupled to the server;
　　instructions to determine, based on the request and the resource type, a second URL associated with the requested resource, wherein the second URL indicates the resource type of the requested resource; and
　　instructions to transmit a response to the remote device that includes the second URL, wherein the remote device is configured to:
　　　　identify the resource type of the requested resource based on the response;
　　　　present the requested resource using a user interface of the application when the application is capable of presenting the identified resource type; and
　　　　present the requested resource using a web browser of the remote device that is distinct from the application when the application is not capable of presenting the identified resource type.

28. The non-transitory computer-readable storage medium of claim 27, comprising:
　　instructions to determine, based on the request, that the remote device is a mobile device; and
　　instructions to determine the second URL based on the remote device being determined to be the mobile device.

29. The non-transitory computer-readable storage medium of claim 27, comprising:
　　receiving a second request including the second URL; and
　　transmitting at least a portion of the requested resource in response to receiving the second request.

* * * * *